United States Patent
Blasco Serrano et al.

(10) Patent No.: US 10,448,365 B2
(45) Date of Patent: Oct. 15, 2019

(54) METHOD AND AN APPARATUS FOR REFERENCE SIGNAL AND MAPPING FOR SIDELINK COMMUNICATIONS

(71) Applicant: Telefonaktiebolaget LM Ericsson (publ), Stockholm (SE)

(72) Inventors: Ricardo Blasco Serrano, Espoo (FI); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/092,866

(22) PCT Filed: Apr. 12, 2017

(86) PCT No.: PCT/IB2017/052123
§ 371 (c)(1),
(2) Date: Oct. 11, 2018

(87) PCT Pub. No.: WO2017/178993
PCT Pub. Date: Oct. 19, 2017

(65) Prior Publication Data
US 2019/0141675 A1  May 9, 2019

Related U.S. Application Data

(60) Provisional application No. 62/321,312, filed on Apr. 12, 2016, provisional application No. 62/321,485, filed on Apr. 12, 2016.

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0007* (2013.01); *H04L 5/0051* (2013.01);
(Continued)

(58) Field of Classification Search
CPC ....... H04W 72/02; H04W 76/14; H04W 4/40; H04L 5/0007; H04L 5/0051; H04L 27/0607; H04L 27/2613
See application file for complete search history.

(56) References Cited

U.S. PATENT DOCUMENTS

| 2014/0341180 A1* | 11/2014 | Liu | ......... | H04L 5/0051 370/330 |
| 2015/0131566 A1* | 5/2015 | Seo | ......... | H04B 1/3838 370/329 |

(Continued)

FOREIGN PATENT DOCUMENTS

| RU | 2014135416 A1 | 3/2016 |
| WO | 2015/021317 A1 | 2/2015 |
| WO | 2015/122715 A1 | 8/2015 |

OTHER PUBLICATIONS

International Search Report and Written Opinion of the International Searching Authority dated Jul. 11, 2017 and issued in corresponding PCT Application No. PCT/IB2017/052123, consisting of 17 pages.

(Continued)

*Primary Examiner* — Jaison Joseph
(74) *Attorney, Agent, or Firm* — Christopher & Weisberg, P.A.

(57) ABSTRACT

UE (12) for transmission of a demodulation reference signal, DMRS, for sidelink communications is provided. UE (12) includes processing circuit (26) configured to: determine at least one transmission parameter associated with at least one of data transmission and control information transmission, and generate a DMRS using the determined at least one transmission parameter. UE (12) includes transmitter circuit (22) configured to transmit the DMRS.

23 Claims, 11 Drawing Sheets

(51) Int. Cl.

| | |
|---|---|
| *H04L 27/26* | (2006.01) |
| *H04W 4/70* | (2018.01) |
| *H04W 76/14* | (2018.01) |
| *H04W 4/40* | (2018.01) |
| *H04W 4/04* | (2009.01) |
| *H04W 8/00* | (2009.01) |
| *H04W 4/06* | (2009.01) |

(52) U.S. Cl.
CPC ...... *H04L 27/2607* (2013.01); *H04L 27/2613* (2013.01); *H04W 4/40* (2018.02); *H04W 4/70* (2018.02); *H04W 76/14* (2018.02); *H04W 4/046* (2013.01); *H04W 4/06* (2013.01); *H04W 8/005* (2013.01)

(56) References Cited

U.S. PATENT DOCUMENTS

| | | | |
|---|---|---|---|
| 2015/0326362 A1 | 11/2015 | Xiong et al. | |
| 2016/0249355 A1* | 8/2016 | Chae | H04W 72/1263 |
| 2017/0054540 A1* | 2/2017 | Kim | H04L 5/0048 |
| 2017/0070968 A1 | 3/2017 | Kim et al. | |
| 2017/0222787 A1* | 8/2017 | Suzuki | H04W 72/04 |
| 2018/0139640 A1* | 5/2018 | Chae | H04W 24/02 |
| 2018/0332491 A1* | 11/2018 | Eckardt | H04L 5/0051 |
| 2018/0375710 A1* | 12/2018 | Chae | H04L 5/00 |
| 2019/0052329 A1* | 2/2019 | Aiba | H04B 7/0615 |
| 2019/0089451 A1* | 3/2019 | Seo | H04W 88/04 |
| 2019/0116565 A1* | 4/2019 | Chae | H04W 24/10 |

OTHER PUBLICATIONS

Ericsson: "Outstanding Issues for D2D Physical Channels, QCL and Timing", 3GPP Draft; R1-144324 PHY Channels, 3rd Generation Partnership Project (3GPP), Mobile Competence Centre; Document for Discussion and Decision; Agenda Item: 7.2.1.2.6, Ljubljana, Slovenia, Oct. 6-10, 2014, consisting of 4 pages.

LG Electronics Inc.: "Discussion on Sidelink Synchronization Enhancement for PC5 Based V2V", 3rd Generation Partnership Project (3GPP), Mobile Competence Centre; Document for Discussion and Decision; Agenda Item: 7.3.2.4, Busan, Korea, Apr. 11-15, 2016, consisting of 5 pages.

Nokia et al.: "Evaluation of DMRS Enhancement for V2V With High Doppler" 3rd Generation Partnership Project (3GPP) Mobile Competence Centre; Document for Discussion and Decision; Agenda Item: 7.3.2.1.1, Busan, Korea, Apr. 11-15, 2016, consisting of 10 pages.

International Preliminary Report on Patentability dated Apr. 6, 2018 and issued in corresponding PCT Application No. PCT/IB2017/052123, consisting of 26 pages.

Russian Decision on Grant with Search Report and English translation thereof, dated Jun. 26, 2019 issued in rresponding Russian Patent Application No. 2018139498/07 consisting of 21 pages.

* cited by examiner

METHOD AND AN APPARATUS FOR REFERENCE SIGNAL AND MAPPING FOR SIDELINK COMMUNICATIONS

CROSS-REFERENCE TO RELATED APPLICATIONS

This application is a Submission Under 35 U.S.C. § 371 for U.S. National Stage Patent Application of International Application No. PCT/IB2017/052123, filed Apr. 12, 2017, entitled "METHOD AND AN APPARATUS FOR REFERENCE SIGNAL AND MAPPING FOR SIDELINK COMMUNICATIONS," which claims priority to U.S. Provisional Application No. 62/321,312, filed Apr. 12, 2016, entitled "METHOD AND AN APPARATUS FOR REFERENCE SIGNAL AND MAPPING FOR SIDELINK COMMUNICATIONS," and U.S. Provisional Application No. 62/321,485, filed Apr. 12, 2016, the entireties of all of which are incorporated herein by reference.

TECHNICAL FIELD

The present disclosure relates to the generation, mapping, and transmission of reference signals used for channel estimation for sidelink or Device-to-Device (D2D) communication, and in particular to methods and apparatuses for generating sequences of reference signals and mapping them to subframes using implicit or explicit rules that reduce cross correlation and interference across D2D or sidelink capable user equipments.

BACKGROUND

The Third Generation Partnership Project (3GPP) Release 12 (Rel-12) of the long term evolution (LTE) standard has been extended with support for D2D (also referred to as "sidelink") features targeting both commercial and public safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices.

One of the potential extensions for D2D systems includes support for V2x communication, which includes any combination of direct communication between vehicles Vehicle-to-Vehicle (V2V), Vehicle-to-Infrastructure (V2I) communication, or Vehicle-to-Pedestrians (V2P). V2x communication may take advantage of a Network (NW) infrastructure, when available, but at least basic V2x connectivity should be possible even in case of lack of NW coverage. Providing an LTE-based V2x interface may be economically advantageous because of the LTE economies of scale and it may enable tighter integration between communications with the NW Infrastructure and V2I/V2P/V2V communications, as compared to using a dedicated V2x technology.

V2x communications may carry both non-safety and safety information, where each of the applications and services may be associated with specific requirements sets, e.g., in terms of latency, reliability, capacity, etc. European Telecommunication Standards Institute (ETSI) has defined two types of messages for road safety: Co-operative Awareness Message (CAM) and Decentralized Environmental Notification Message (DENM). The CAM message is intended to enable vehicles, including emergency vehicles, to notify their presence and other relevant parameters in a broadcast manner Such messages target other vehicles, pedestrians, and infrastructure, and are handled by their applications. CAM messages also serve as active assistance to safety driving for normal traffic. The availability of a CAM message is indicatively checked, for example, every 100 ms, yielding a maximum detection latency requirement of <=100 ms for most messages. However, the latency requirement for pre-crash sensing warning is typically around 50 ms.

The DENM message is event-triggered, such as by a car braking, and the availability of a DENM message is also checked, for example, every 100 ms. The requirement of maximum latency is <=100 ms. The package size of CAM and DENM messages vary from 100 to 800 bytes, and the typical size is around 300 bytes. The message is supposed to be detected by all vehicles in proximity. The Society of the Automotive Engineers (SAE) also defines a Basic Safety Message (BSM) for Dedicated Short-Range Communications (DSRC) with various messages sizes. According to the importance and urgency of the messages, the BSMs are further classified into different priorities.

Further, there have been discussions within 3GPP regarding reference signals for V2V communications. Major changes are necessary to implement reference signals for V2V communications when compared to LTE legacy because UEs engaged in V2V communications travel at very high speeds (up to 500 km/h relative speed) and may use higher carrier frequencies (up to 6 GHz) than in traditional cellular applications. This leads to larger Doppler spread and Doppler shift that impair the communications.

One proposal under consideration is to transmit DMRS (DeModulation Reference Signals) in all (or at least most) transmitted Orthogonal Frequency Division Multiplexing (OFDM) symbols, but only in a subset of subcarriers, for example, as depicted in FIG. 1 and FIG. 2. In particular, FIG. 1 is a block diagram of a mapping of reference symbols to every OFDM symbol with fixed subcarriers, and FIG. 2 is a block diagram of a mapping of reference symbols to every OFDM symbol with varying subcarriers or subcarrier offset. This manner of mapping DMRS to the subframe is referred to as "2H" (i.e., 2 "horizontal" DMRS per resource block).

Another proposal under consideration is to transmit DMRS in all (or at least most) transmitted OFDM symbols, but only in a subset of subcarriers. For example, as depicted in FIG. 1 and FIG. 2. FIG. 1 illustrates a 1 ms long subframe including fourteen OFDM symbols, one OFDM symbol being the Guard Period (GP) including six subcarriers, and also showing a so-called Automatic Gain Control (AGC) settling. AGC circuits are usually employed in many systems where the amplitude of an incoming signal may vary over a wide dynamic range. The role of an AGC circuit is to provide a relatively constant output amplitude so that circuits following the AGC circuit require less dynamic range. If the signal level changes are much slower than the information rate contained in the signal, then an AGC circuit can be used to provide a signal with a well-defined average level to downstream circuits. In most system applications, the time to adjust the gain in response to an input amplitude change should remain constant, independent of the input amplitude level and hence gain setting of the amplifier. Achieving a constant gain settling time permits the AGC loop's bandwidth to be maximized for fast signal acquisition while maintaining stability overall operating conditions. For both FIG. 1 and FIG. 2, it is not required to transmit the GP OFDM symbol.

The radio communication channel is correlated in time. That is, channel samples taken sufficiently close to each other are similar (in a statistical sense). The properties of time correlation depend on the carrier frequency and the speed of the mobile terminals or User Equipments (UEs) as well as other aspects such as the propagation environment, etc. This correlation is usually exploited by the channel estimation algorithms for example by applying some time-domain filtering.

In the case of synchronous multiuser (or multi UEs) communications, a receiver may receive a linear combination of the reference signals sent by multiple transmitters. Most often, the receiver is interested in estimating the channel from each individual transmitter (rather than the combined channel from all the transmitters). For that purpose, the receiver may make use of the time correlation properties of the channel. One known way doing this is to ensure that the sequences of reference symbols transmitted by the interfering UEs have good cross correlation properties. For example, LTE uses Orthogonal Cover Codes (OCCs) to generate orthogonal sequences and semi-orthogonal base sequences. Semi-orthogonal base sequences are referred to as sequences with low cross correlation properties.

The current sequences used for reference symbols (e.g., DMRS sequences) and the mapping rules for mapping references symbols to physical resource elements fail to provide good performance in multiuser V2V communications, especially if the assumed DMRS mapping is going to be revised by 3GPP into something quite different from, for example, the DMRS mapping so far used for sidelink (or D2D) DMRS. For example, if the density of DMRS REs (Resource Elements) is reduced in the frequency domain, the low cross-correlation properties between signal and interference enabled by the existing DMRS design are reduced and the interference increases.

SUMMARY

The present disclosure advantageously provides a method and an apparatus for solving at least some of the aforementioned problems, for example, by generating sequences of reference signals (e.g. DMRS) and by mapping them to the subframes using rules (implicit or explicit) that reduce cross correlation and interference across UEs. The apparatus is in the form of a user equipment (UE) capable in using sidelink or D2D communications with other UEs.

According to another aspect, there is provided a method performed by a first user equipment (UE) operating in a wireless system employing sidelink or D2D communications. The wireless system comprises at least a second UE capable in performing sidelink or D2D communications. The method comprising: generating at least one reference sequence of at least one reference signal; mapping the at least one reference sequence of the at least one reference signal to at least one subframe for sidelink or D2D communication, wherein the mapping is specific to the first UE; and transmitting the mapped reference sequence of the at least one reference signal to the second UE in order to reduce correlation, and thus reduced interference between reference signal Resource Elements (REs) belonging to the first UE respectively the second UE.

According to another aspect, there is provided a first user equipment (UE) operating in a wireless system employing sidelink or D2D communications. The wireless system comprises at least a second UE capable in performing sidelink or D2D communication. The first UE comprising a processor or a processing module and a memory or a memory module. The memory or the memory module contains instructions executable by the processor or the processor module whereby the first UE is operative or configure to generate at least one reference sequence of at least one reference signal; map the at least one reference sequence of the at least one reference signal to at least one subframe for sidelink or D2D communication, wherein the mapping operation is specific to the first UE; and to transmit the mapped reference sequence of the at least one reference signal to the second UE in order to reduce correlation, and thus reduced interference between reference signal Resource Elements (REs) belonging to the first UE respectively the second UE.

An advantage with the solution(s) described herein is to reduce cross correlation, and thus reduce interference between reference signals (e.g. DMRS signals) belonging to different UEs by determining UE specific mapping(s) of reference signals that reduce the likelihood of reference signal-to-reference signal interference, and hence enable adequate channel estimation quality in, for example, rapidly changing channel conditions.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
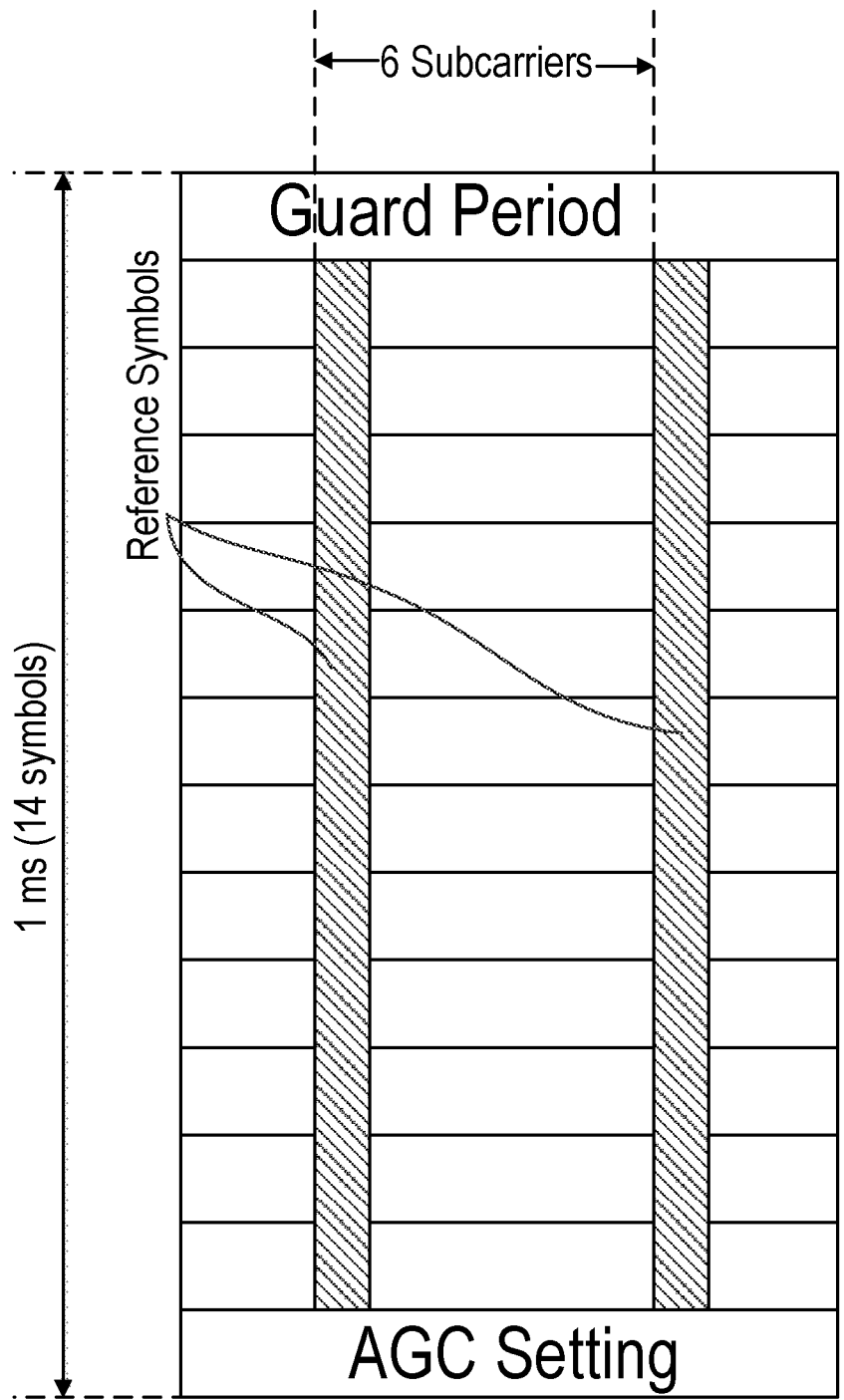
FIG. 1 is a block diagram of a mapping of reference symbols to every OFDM symbol with fixed subcarriers.
Figure 2:
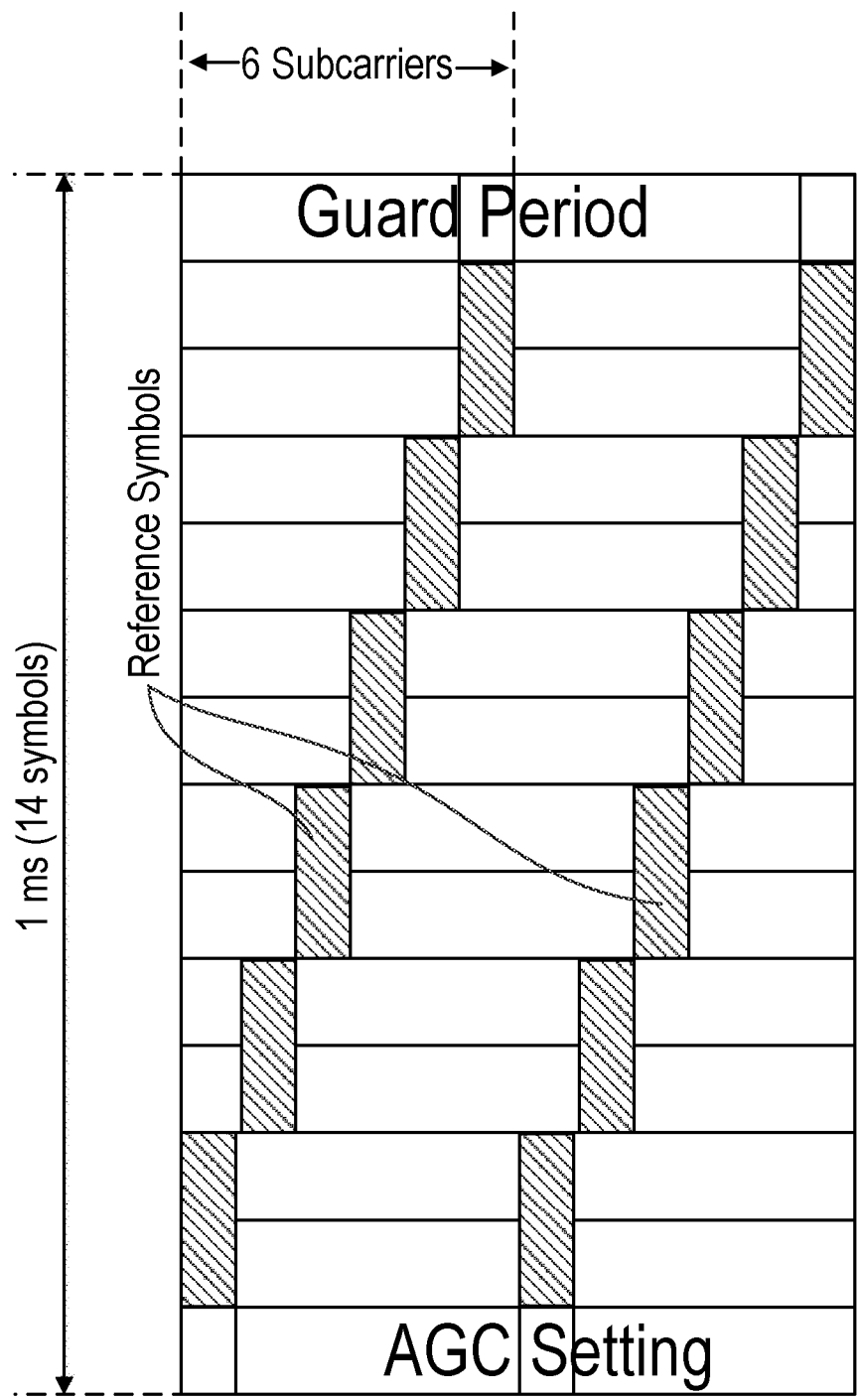
FIG. 2 is a block diagram of a mapping of reference symbols to every OFDM symbol with varying subcarriers or subcarrier offset.

The present disclosure relates to channel estimation for sidelink or Device-to-Device (D2D) communication, and in particular to methods and apparatuses for generating, mapping, and transmitting reference signals used for channel estimation for sidelink or Device-to-Device (D2D) communication. The present disclosure provides for generating sequences of reference signals and mapping the generated sequences to subframes using implicit or explicit rules that reduce cross correlation and interference across D2D or sidelink capable UEs. The method and arrangements disclosed herein may be used for cellular or direct communication in general.

The present disclosure is in the context of D2D (or sidelink, peer to peer, or ProSe) and particularly V2V or V2x systems where the channel conditions may vary rapidly. However, some of the embodiments herein are applicable to communication among any type of network entities, including uplink from some devices to a central control node.

In general, D2D communications are under study/standardization as a technology enabler for V2V or V2x communication systems. Acquiring accurate timing and frequency synchronization is critical in D2D communications since the traditional sources of synchronization, e.g., a network (NW) entity such as a base station or an LTE enhanced node B (eNB) are sometimes not involved in the communication (e.g., if the network entities are out of coverage), and therefore are not able to provide timing and frequency synchronization. This is relevant in V2V communications for two reasons: first, wireless devices (e.g. UEs) travel at high speeds resulting in Doppler spread of the signals; and second, the frequency bands dedicated to intelligent transport systems (ITS) are placed at much higher frequencies than those of traditional cellular NWs. The disclosure takes in to account these problems with existing systems and advantageously provides methods and apparatuses for generating, mapping, and transmitting reference signals used for channel estimation for sidelink or Device-to-Device (D2D) communication that reduce cross correlation, and thus reduce interference between reference signals (e.g. DMRS signals) belonging to different UEs by determining UE specific mapping(s) of reference signals that reduce the likelihood of reference signal-to-reference signal interference, and hence enable adequate channel estimation quality in, for example, rapidly changing channel conditions.

Before describing in detail exemplary embodiments, it is noted that the embodiments reside primarily in combinations of apparatus components and processing steps related to generation, mapping, and transmission of reference signals used for channel estimation for sidelink or Device-to-Device (D2D) communication. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 3:
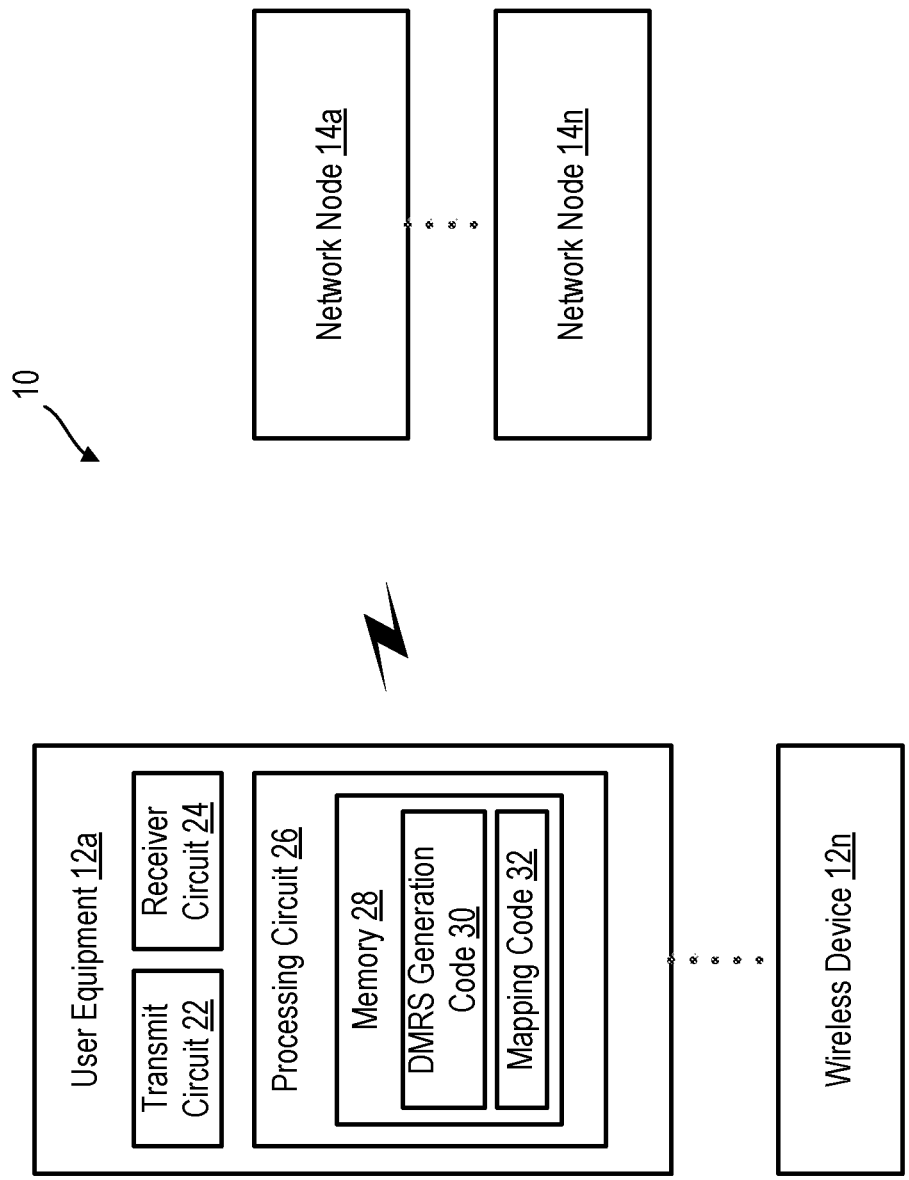
FIG. 3 is a block diagram of an exemplary system for reference signal generation and/or mapping in accordance with the principles of the disclosure.

Referring now to drawing figures in which like reference designators refer to like elements there is shown in FIG. 3 a block diagram of an exemplary system for reference signal generation and/or mapping in accordance with the principles of the disclosure and designated generally as "10." System 10 includes one or more user equipments (UEs) 12a-12n and one or more network entity 14a-14n in communication with each other via one or more communication links, paths and/or networks via one or more communication protocols such as D2D, V2X, etc. As used herein, UE 12 refers to one or more of UEs 12a-12n, and network entity 14 refers to one or more of network entities 14a-14n.

In one or more embodiments, UE 12 is generally a wireless device. A wireless device is any type of device that is configured or configurable for communication through wireless communication. Examples of such wireless devices are sensors, modems, smart phones, machine type (MTC) devices a.k.a. machine to machine (M2M) devices, PDAs, iPADs, Tablets, smart phones, laptop embedded equipped (LEE), laptop mounted equipment (LME), USB dongles, etc. In one or more embodiments, network entity 14 is an evolved NodeB (eNB), base station, radio base station, base transceiver station, remote radio unit (RRU), remote radio head (RRH), access point, among other types of nodes known in the art.

UE 12 such as a D2D or sidelink UE 12 includes transmit circuit 22 or transmit module 22 and receiver circuit 24 or receiver module 24 for communicating with one or more network entities 20 and with one or more other UEs 12, among other entities and devices in system 10. UE 12 includes processing circuit 26 or processing module 26 or processor 26 or processing means 26. Processing module/circuit 26 includes a processor, microprocessor, an application specific integrated circuit (ASIC), field programmable gate array (FPGA), or the like, and may be referred to as the "processor 26." Processor 26 controls the operation of the D2D UE 12 and its components. Memory (circuit or module) 28 includes a random access memory (RAM), a read only memory (ROM), and/or another type of memory to store data and instructions that may be used by processor 26. In general, it will be understood that UE 12 such as D2D UE 12 in one or more embodiments includes fixed or programmed circuitry that is configured to carry out the operations in any of the embodiments disclosed herein.

In at least one such example, UE 12 such as D2D UE 12 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the D2D UE operations disclosed herein.

UE 12 includes memory 28 that is configured to store data, programmatic software code and/or other information described herein. Memory 28 or memory module 28 is configured to store DMRS generation code 30 and mapping code 32. For example, DMRS generation code 30 includes instructions that, when executed by processor 26, causes processor 26 to perform the process discussed in detail with respect to FIGS. 5-6. For example, mapping code 32 includes instructions that, when executed by processor 20, causes processor 20 to perform the mapping process of mapping reference signals to subframes discussed herein. In one or more embodiments, UE 12 includes antenna circuitry (not shown). In one or more embodiments, a transceiver circuit or transceiver module (not shown) includes transmitter circuit 22 and receiver circuit 24.

As previously described, UE 12 may be a wireless device, e.g., a mobile terminal, wireless terminal, mobile station, mobile telephone, cellular telephone, or a smart phone. Further examples of different wireless devices comprise laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, Machine-to-Machine (M2M) capable devices or UEs, Machine Type Communication (MTC) devices such as sensors, e.g., a sensor equipped with UE, just to mention some examples. In one or more embodiments, network entity includes the corresponding components, e.g., processing circuit, memory, transmit circuit, receiver circuitry, etc., as described with respect to UE 12, but with size and performance being based on design need.

In one or more embodiments, processing circuit 26 is configured to generate at least one reference sequence of at least one reference signal; map the at least one reference sequence of the at least one reference signal to at least one subframe for sidelink or D2D communication, wherein the mapping operation is specific to first UE 12; and to transmit the mapped reference sequence of the at least one reference signal to second UE 12 in order to reduce correlation, and thus reduce interference between reference signal Resource Elements (REs) belonging to first UE 12 and second UE 12, respectively. Further, it will be appreciated that the D2D UE 12 may comprise additional components not shown in FIG. 3.

Figure 4:
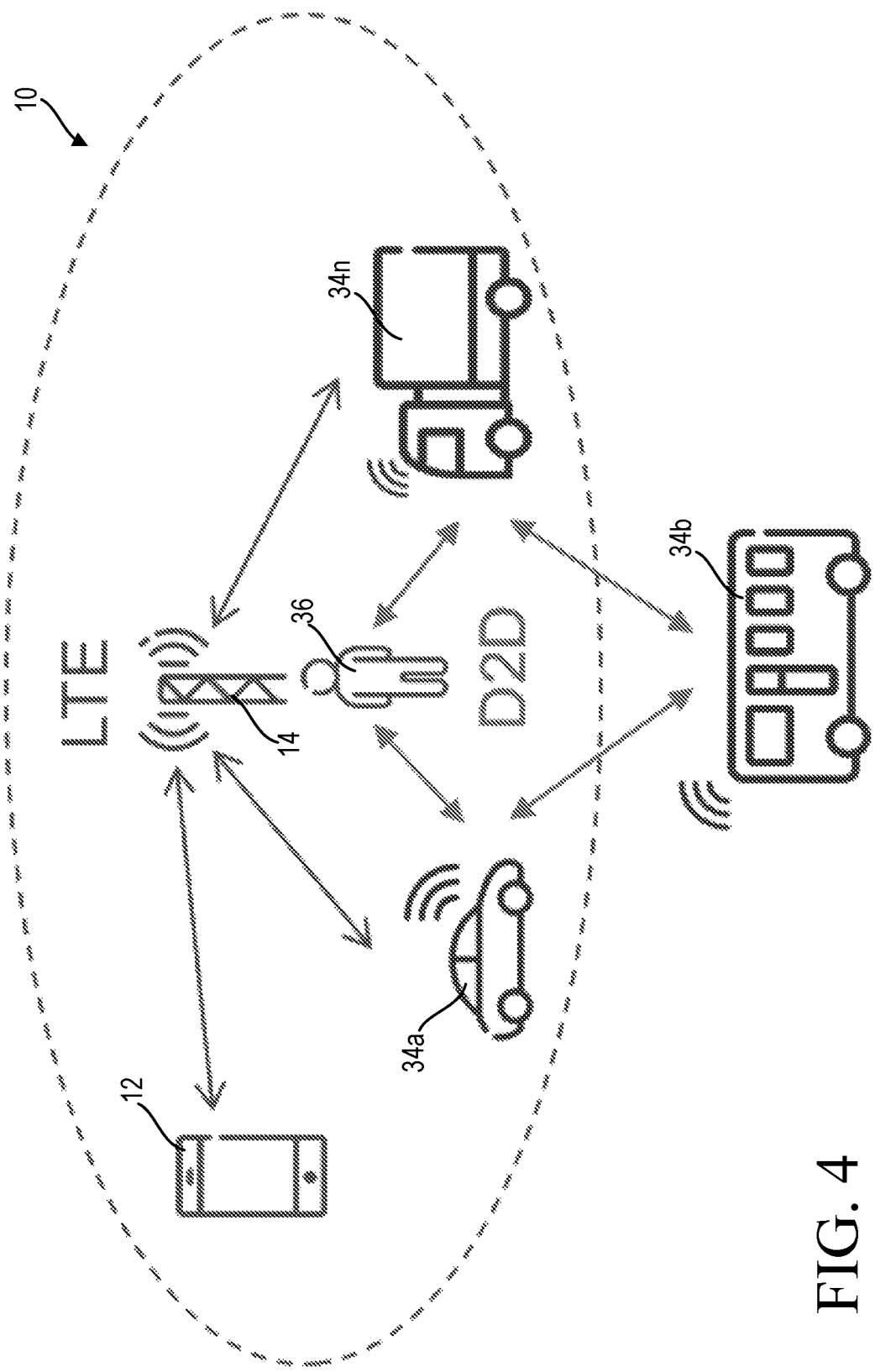
FIG. 4 is a block diagram of a D2D based V2x or V2V communication network incorporating the principles of the present disclosure.

FIG. 4 is a block diagram of a D2D based V2x or V2V communication network or network, such as an LTE-based network, incorporating the principles of the present disclosure. It should be noted that the present disclosure is not limited to LTE network technologies specifically. The method and arrangement disclosed herein may be applied to other communication network technologies such as the upcoming fifth Generation (5G) technology based network. The D2D communication network 10 includes, as previously discussed, several V2x scenarios, including vehicle-to-vehicle (V2V), vehicle-to-pedestrian (V2P) and vehicle-to-infrastructure (V2I). In the V2V scenario, two or more vehicles, e.g., vehicles 34a-34n, etc., are in communication with each other over one of several types of communication networks such as a cellular network, the Internet, application servers or the like. V2V communications allows the driver in one vehicle 34 to warn drivers in other vehicles 34 about roadside hazards and to provide forward collision warnings. In the V2P scenario, vehicle 34 such as vehicle 34a is in communication with pedestrian's wireless device, i.e., pedestrian 36. This allows pedestrians 36 to be informed about threats from vehicle collisions and other roadside hazards. In the V2I scenario, a vehicle 34 such as vehicle 34b communicates with a road side-unit (RSU) such as via DSRC where the RSU can inform the vehicle's driver with regard to navigation, telematics and other cloud services.

The pedestrian 36 or any of the vehicles 34 depicted in FIG. 1 may communicate with each other via respective UE 12. For example, pedestrian 36, vehicles 34 and infrastructure shown in FIG. 1 each may each include a UE 12. In system 10 such as D2D network 10, two or more UEs 12 directly communicate with each other without having the payload traverse the backhaul network.

In cellular network assisted D2D communications, UEs 12 (only one shown) in the vicinity of each other can establish a direct radio link, i.e., a D2D bearer. While UEs 12 communicate over the D2D "direct" bearer, they may also maintain a cellular connection with a network entity 14 such as their respective serving base station, for example, an LTE eNB. Network entity 14 serves UEs 12 in a region of coverage of network entity 14. UEs 12 may also be out-of-coverage and hence only communicate directly with each other using sidelink or D2D communications.

Figure 5:
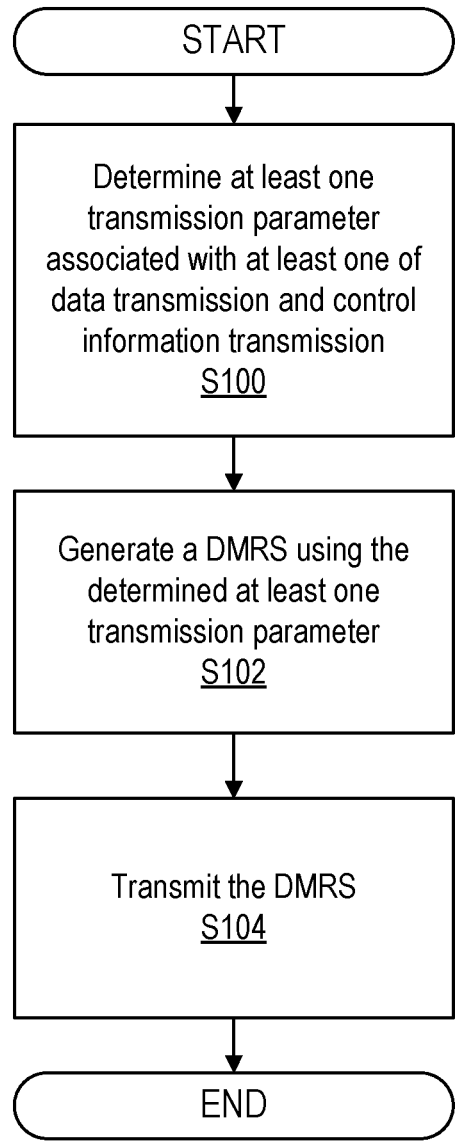
FIG. 5 is a flow diagram of an exemplary DRMS generation process of DMRS generation code in accordance with the principles of the disclosure.

FIG. 5 is a flow diagram of an exemplary DRMS generation process of DMRS generation code 30 in accordance with the principles of the disclosure. Processing circuit 26 determines at least one transmission parameter associated with at least one of data transmission and control information transmission, as described herein (Block S100). In one or more embodiments, the at least one transmission parameter includes at least one parameter of one of a Physical Sidelink Control Channel (PSCCH) and a Physical Sidelink Shared Channel (PSSCH). In one or more embodiments, the at least one transmission parameter includes at least one parameter of a scheduling assignment associated with at least one of the data transmission and the control information transmission. In one or more embodiments, the at least one transmission parameter includes at least one of: a frequency position of resources associated with at least one of data transmission and control information transmission, a priority of content included in a Physical Sidelink Control Channel, PSCCH, and a number of transmissions of a transmission block.

Processing circuit 26 generates a DMRS using the determined at least one transmission parameter, as described herein (Block S102). In one or more embodiments, processing circuit 26 is further configured to determine a base sequence based on the at least one transmission parameter, the DMRS being generated based on the base sequence. In one or more embodiments, the base sequence is generated for each OFDM symbol that carries the DMRS in which the base sequence is based on the at least one transmission parameter.

In one or more embodiments, processing circuit 26 is further configured to determine a cyclic shift (CS) based on the at least one transmission parameter in which the CS is applied to each base sequence. In one or more embodiments, processing circuit 26 is further configured to determine a CS based on the at least one transmission parameter in which the DMRS is generated based on the CS. In one or more embodiments, processing circuit 26 is further configured to determine an orthogonal cover code, OCC, based on the at least one transmission parameter in which the DMRS is generated based on the OCC. In one or more embodiments, the OCC is applied in a time domain to symbols of the DMRS.

Transmitter circuit 22 transmits the DMRS, as described herein (Block S104). In one or more embodiments, processing circuit 26 is further configured to map the DMRS to a plurality of resources elements of a plurality of subcarriers in which the plurality of subcarriers has subcarrier indices of $\{k, n+k, 2n+k, 3n+k, \ldots\}$, where k is greater than 0, and n is greater than k.

Figure 6:
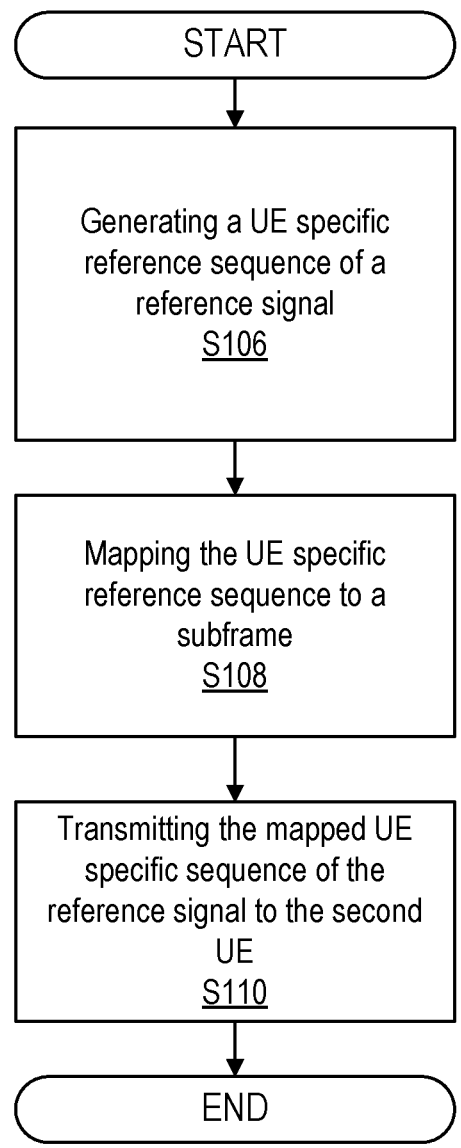
FIG. 6 is a block diagram of a DMRS generation and mapping process in accordance with the principles of the disclosure.

One embodiment of a method performed by a first UE (e.g. UE 12) is presented below in conjunction with FIG. 6. In particular, FIG. 6 is a block diagram of a DMRS generation and mapping process in accordance with the principles of the disclosure. In one or more embodiments, the process of FIG. 6 is another embodiment of DMRS generation code 30 and/or mapping code 32. The steps including:

Generating, by processing circuit 26 of first UE 12, at least one reference sequence of at least one reference signal, e.g., a DMRS, to be transmitted to second UE 12, as described herein (Block S106);

Mapping the at least one reference sequence of the at least one reference signal to at least one subframe for sidelink or D2D communication with second UE 12, wherein the mapping is specific, i.e., unique, to first UE 12, as described herein (Block S108); and Transmitting the mapped reference sequence of the at least one reference signal to second UE 12 in order to reduce the correlation, and thus reduce interference between reference signal Resource Elements (REs) belonging to first UE 12 and second UE 12, respectively, as described herein (Block S110).

As indicated above, each UE 12 such as first UE 12 and second UE 12 perform a unique UE specific mapping as described herein such as with respect to FIGS. 7-10.

As previously disclosed, some embodiments herein comprise of two parts: DMRS sequence generation and DMRS mapping to the radio resources, which are discussed separately and then discussed in combination, below.

A DMRS sequence may be generated by UE 12, e.g., first UE 12, by generating a first "base sequence", e.g., from a predefined set of tabulated sequences or according to some predefined algorithm. Such base sequence provides good autocorrelation properties (i.e., nearly impulse autocorrelation) and good (i.e., low) cross correlation to other base sequences in order to limit interference. Additional processing may be applied to the base sequence by, e.g., applying a so called CS (Cyclic shift) in time domain, or equivalently a phase shift that increases linearly with frequency in the frequency domain. Further processing may consist of applying a time-domain code that spans several DMRS symbols. Additional processing of the sequences is not precluded by the embodiments herein.

Both UEs 12 such as first UE 12 and second UE need to generate the DMRS sequences in order to respectively transmit the DMRS and estimate the channel associated to the received DMRS, which involves correlating the received signal with the sequence of the DMRS. Once the DMRS sequence has been generated by first UE 12 or the sequence generated UE 12, it is mapped to a subset of the REs for transmission. According to an example embodiment herein, the following procedure or method is performed by processor 26 or processing circuit 26 or processing module 26:

1. Base sequence generation: A DMRS base sequence is generated per each OFDM symbol that carries DMRS.

2. Cyclic shift generation and application: A CS is applied to each base sequence according to predefined procedures for determining a symbol-specific and, in certain cases, transmitter-ID-specific CS value.

3. OCC generation and application: A OCC (orthogonal cover code) is applied across the DMRS symbols in time domain, by applying a symbol-specific coefficient (+1/−1) according to one of several predetermined codes. The code is in certain cases determined based on the identity of UE 12 transmitting, e.g., transmission parameter, which first UE 12 in this example.

4. DMRS mapping: The so determined DMRS symbols are then transmitted using all the REs corresponding to first UE 12's scheduled bandwidth and over certain predefined DMRS symbols.

Base sequences are determined in LTE based on sets of indexes (base sequence index and sequence index) and predefined generation methods, possibly based on lookup tables. The indexes of the base sequence used in each OFDM symbol are, in the most general case, a function of both UE specific parameters (e.g., a UE specific "virtual" cell ID) and system/cell specific parameters (e.g., a cell ID). Additionally, a symbol-specific sequence is generated by use of so called hopping patterns which uses some of the UE/cell/system specific parameters, i.e., some of the transmission parameters, to initialize a pseudo-random generator to obtain a symbol-specific base-sequence index.

CS is typically determined in LTE by an integer in [0, 1, . . . , 11] that indicates one of twelve possible CS values to be applied to a DMRS symbol. Similar to the base sequence, also for CS LTE provides ways to generate them as a function of the DMRS symbol (by use of pseudo-random generators) as well as a number of UE/cell/system specific parameters.

An OCC (orthogonal cover code) is applied across the DMRS symbols in time domain, by applying a symbol-specific coefficient (+1/−1) according to one of several predetermined codes. In LTE, only a few OCC are defined in which the OCC can be signaled in a similar way as CS. The term OCC as used herein is used in a non-limiting way to indicate any code that is applied in time domain and that spans some DMRS symbols.

According to an example embodiment, at least some of the parameters, i.e., transmission parameters, that determine the base sequence and/or cyclic shift and/or OCC are a function of parameters for the actual data/control information transmission and/or for the SA (scheduling assignment) that is associated to a certain data transmission. For example, the base sequence index and/or the cyclic shift index and/or OCC index and/or the initialization of the pseudo-random generators used to generate by UE 12, e.g., first UE 12, hopping patterns for the cyclic shift and/or base sequence and/or OCC are a function of the scheduled bandwidth and/or the starting position in frequency domain for the physical channel (e.g., PSSCH or PSCCH) carrying the DMRS. In a further example, the above transmission parameters for an SA carried by a Physical Sidelink Control Channel (PSCCH) determine the DMRS parameters as mentioned above for the associated Physical Sidelink Shared Channel (PSSCH) transmission of UE 12, e.g., first UE 12.

The base sequence/CS/OCC index for at least a subset of the reference symbols is, according to an example herein, a function of transmission parameters, where transmission parameters includes at least one of:

A) Time and/or frequency position of the resources used for transmitting the control information scheduling the transmission (e.g., a scheduling assignment).

B) Frequency position of the resources (REs).

C) The contents of some of the information contained in the control channel (e.g., PSCCH) scheduling the transmission (e.g., PSSCH). In one or more embodiments, this includes at least one of:
  (i) The order of the transmission of the transmission of a given Transport Block (TB). That is, the first/second/third/ . . . transmission of a TB.
  (ii) The identity of UE 12 (e.g., first UE 12, the transmitter), or UE 12 (e.g., second UE 12, the receiver).
  (iii) Priority of the message.
  (iv) The identity corresponding to the synchronization reference (e.g., network entity 14 (eNB, network node, GNSS (satellite), etc.) used for the transmission.

If there are several pools of resources for transmission of the packet/message/signal, some parameter(s) will be associated to the pool or resources (e.g., an identifier, the size of the pool, etc.).

According to an embodiment of the present disclosure, a DMRS mapping to subframe(s), subcarriers, resources, etc. may be performed as will be described below:

Differently than for legacy sidelink, 3GPP is focused on a new way of mapping DMRS to the subframe for sidelink such that only some of the subcarriers in a symbol are used for DMRS REs and the remaining ones are used for data transmissions.

Figure 7:
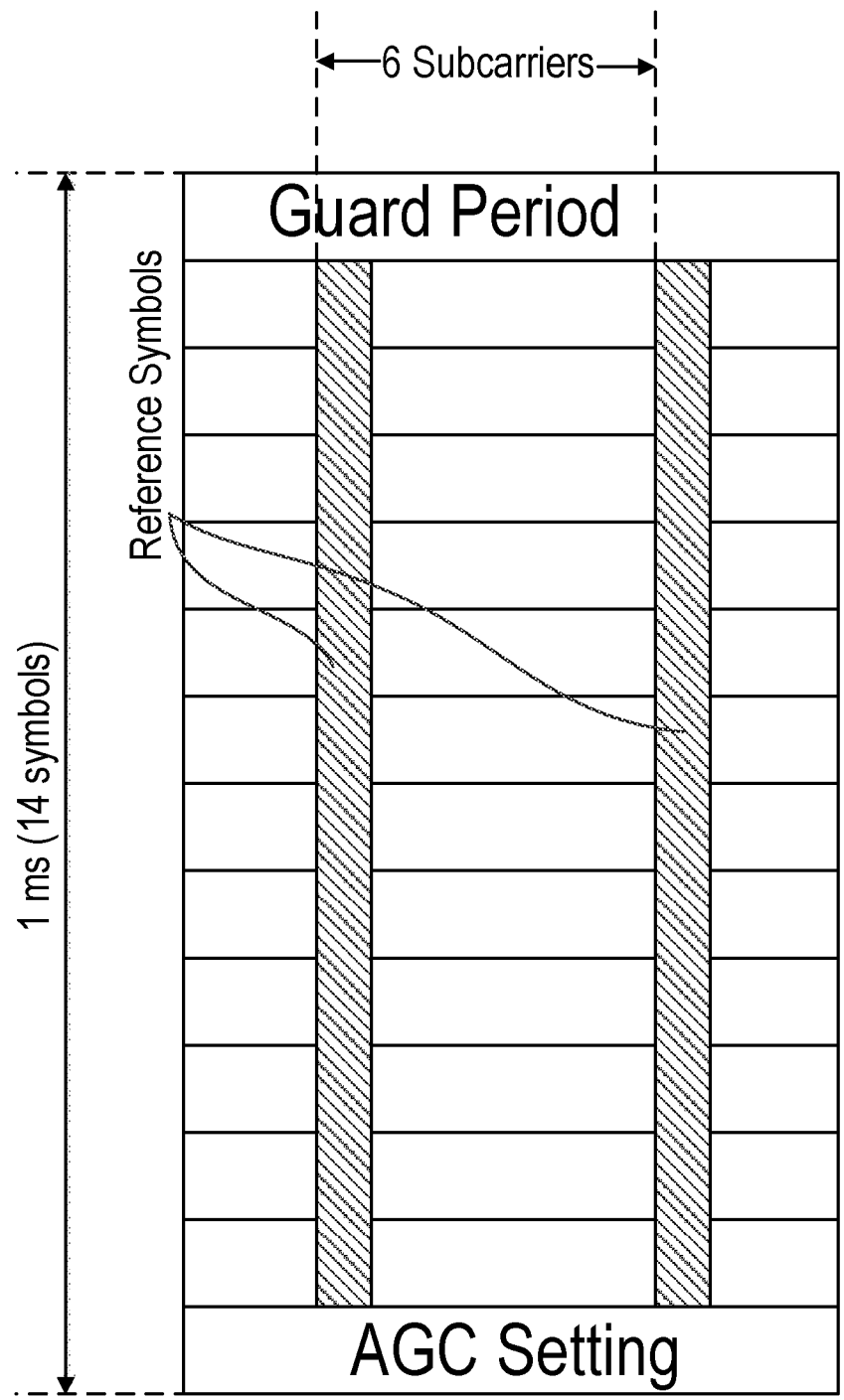
FIGS. 7 and 8 are block diagrams of an example of two different mappings of two different DMRS sequences/symbols in accordance with the principles of the disclosure.
Figure 8:
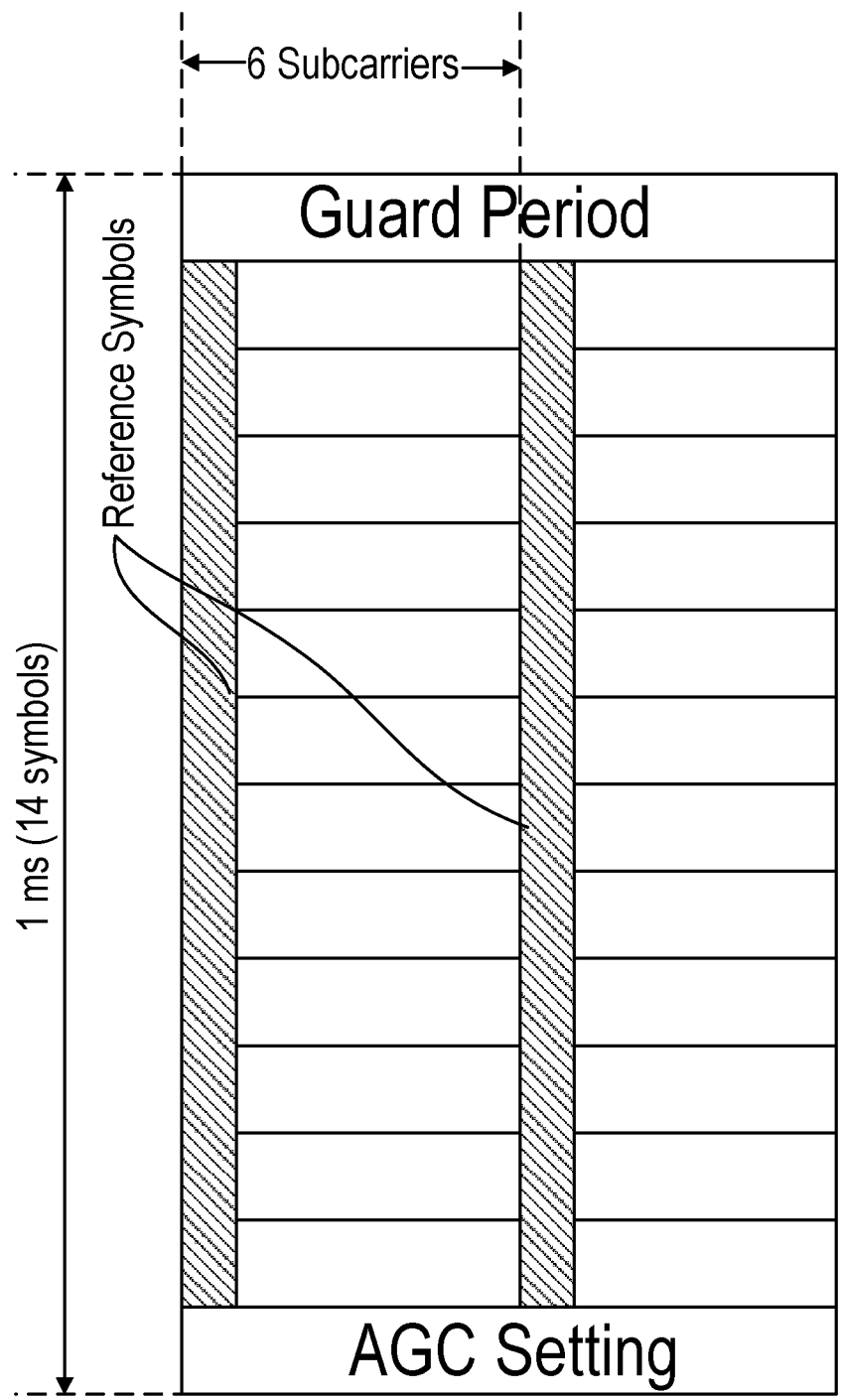

According to an embodiment, reduction of cross correlation (and thus reduce interference) between DMRS belonging to different UEs (first UE 12 with respect to second UE 12) is achieved by determining UE specific mappings of DMRS that reduce the likelihood of DMRS-to-DMRS interference and enable good channel estimation quality. In one or more embodiments, this is done by using a function that determines transmission of DMRS symbols on different resources by different UEs. For example, UE 12, e.g., first UE 12, may transmit DMRS symbols/sequences on subcarriers indexed {k,n+k,2n+k,3n+k, . . . }, for some values of k and n such that 0<k<n. The values of k and/or n may be obtained from the function. Referring to FIGS. 7 and 8, there are illustrated block diagrams of an example of two different mappings of two different DMRS sequences/symbols (e.g., for two different UEs 12, first UE 12 and the second UE 12). In particular, FIGS. 7 and 8 illustrate block diagrams of the UE specific mapping (FIG. 7) of first UE 12 located differently when compared to the UE specific mapping (FIG. 8) of second UE 12. Note that the values of k and/or n may depend on the number of the reference symbols. For example, first UE 12 may transmit the $i^{th}$ DMRS symbol on subcarriers $\{k_i, n_i+k_i, 2n_i+k_i, 3n_i+k_i, \ldots\}$ for some values of $k_i$ and $n_i$ such that $0<k_i<n_i$. The values of $k_i$ and/or $n_i$ may be obtained from the function. Although the DMRS sequence/symbol mappings are fixed, they are located at different location spanning the subframe.

Figure 9:
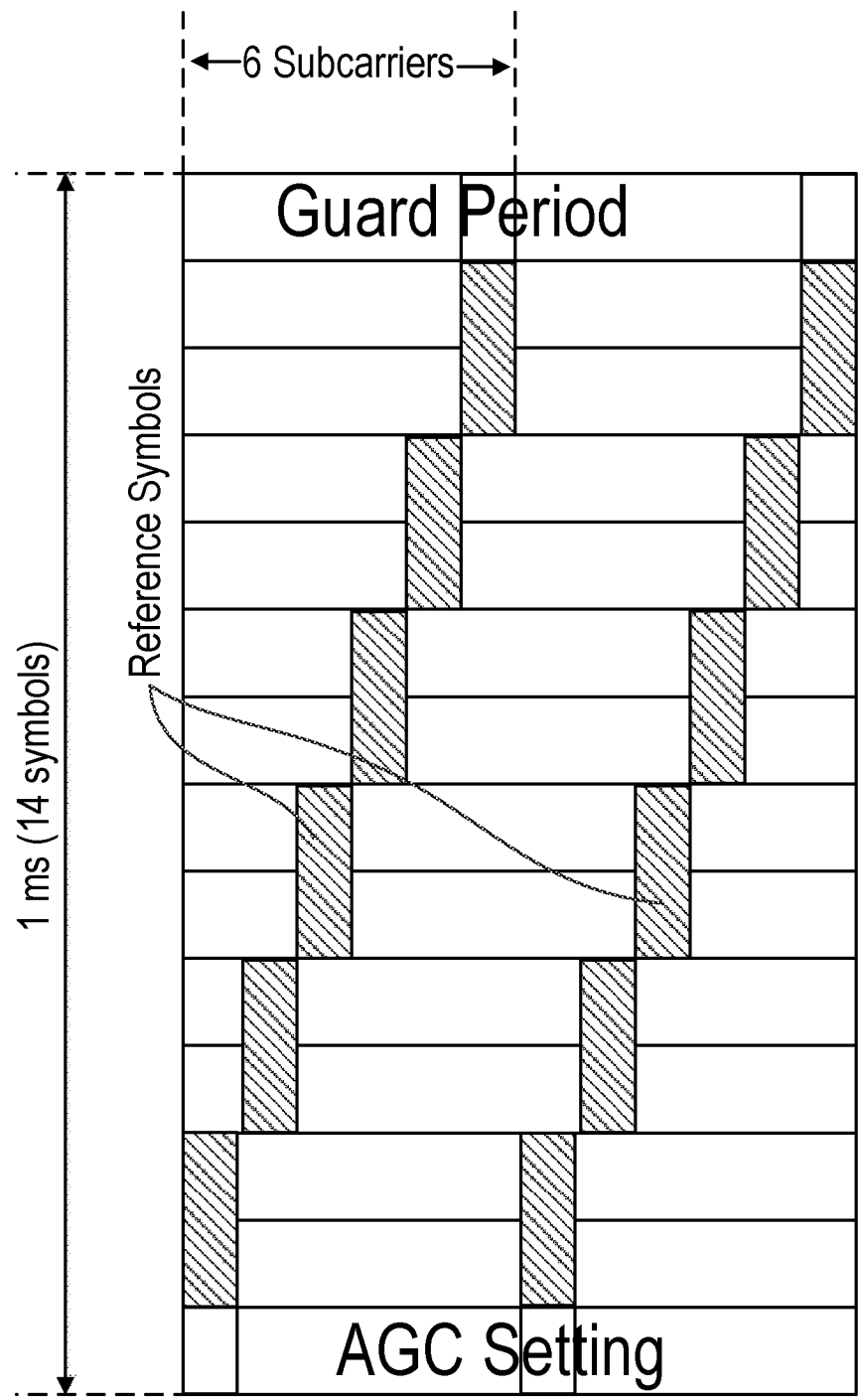
FIG. 9 is a block diagram of another example of mapping of DMRS sequences/symbols used by a first UE in accordance with the principles of the disclosure.
Figure 10:
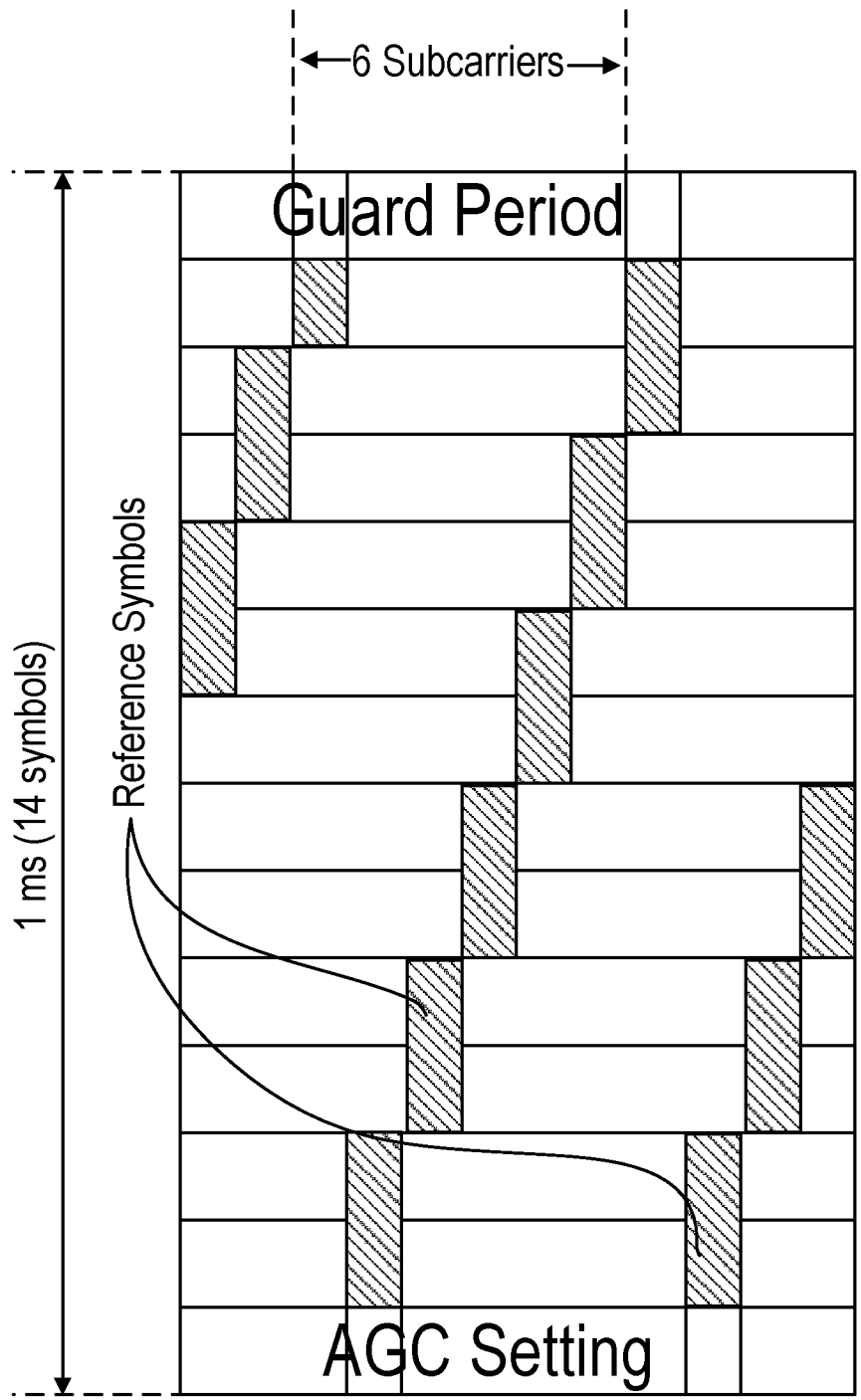
FIG. 10 is a block diagram of another example of mapping of DMRS sequences/symbols used by a second UE in accordance with the principles of the disclosure.

Referring to FIGS. 9 and 10, there is illustrated block diagrams of another example of mapping of DMRS sequences/symbols used by first UE 12 (FIG. 9) and second UE 12 (FIG. 10). As shown, the mapping of the reference symbols to every OFDM symbol has a varying subcarrier offset for both first UE 12 and second UE 12. Note that the placement of varying subcarrier offsets for first UE 12 and second UE 12 are not similar. Hence such varying and different mappings reduce the risk for interference.

As mentioned earlier, the specific parameters (e.g., but not limiting to, ki and/or ni) may be a function of the transmission parameters such as the scheduled bandwidth and/or the starting position in frequency domain for the physical channel (e.g., PSSCH or PSCCH) carrying the DMRS. In a further example, the above transmission parameters for an SA carried by PSCCH determine ki and/or ni as mentioned above for the associated PSSCH transmission. In one or more embodiments, $k_i$ and/or $n_i$ for at least a subset of the reference symbols is a function of (as for the previously described base sequence/CS/OCC index):

1) Time and/or frequency position of the resources used for transmitting the control information scheduling the transmission (e.g., a scheduling assignment).

2) Frequency position of the resources (REs).

3) The contents of some of the information contained in the control channel (e.g., PSCCH) scheduling the transmission (e.g., PSSCH). This includes:

(a) The order of the transmission of a given Transport Block (TB). That is, the first/second/third/ . . . transmission of a TB.

(b) The identity of first UE 12 (the transmitter), or second UE 12 (the receiver).

(c) Priority of the message.

(d) The identity corresponding to the synchronization reference (e.g., network entity 14 (eNB, network node, GNSS (satellite), etc.) used for the transmission.

If there are several pools of resources for transmission of the packet/message/signal, some parameter(s) associated with the pool or resources (e.g., an identifier, the size of the pool, etc.).

Figure 11:
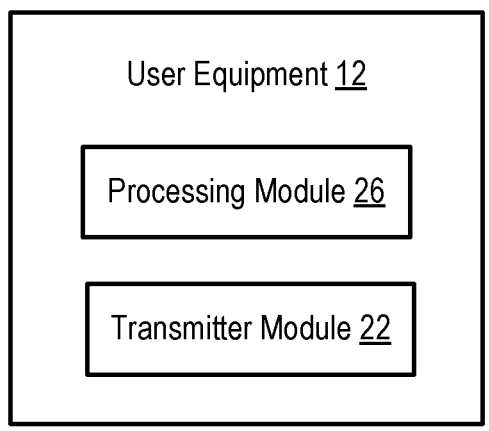
FIG. 11 is a block diagram of an alternative example of UE in accordance with the principles of the disclosure.

FIG. 11 is a block diagram of an alternative example of UE 12. UE 12 includes processing module 26 and transmit module 22 for performing the functions as described herein.

An advantage with the solution described herein is that it reduces cross correlation, and thus reduce interference between reference signals (e.g. DMRS signals) belonging to different UEs 12, e.g., first UE 12 and second UE 12, by determining UE specific mapping(s) of reference signals that reduce the likelihood of reference signal-to-reference signal interference, and hence allows for adequate channel estimation quality in, for example, rapidly changing channel conditions.

Embodiments can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. Embodiments can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the embodiments are not limited to what has been particularly shown and described herein above. In addition, unless mention was made above to the contrary, it should be noted that all of the accompanying drawings are not to scale.

Some Embodiments

The present disclosure advantageously provided a method and an apparatus for solving the aforementioned problem with existing systems in two ways: by generating sequences of reference signals (e.g. DMRS) and by mapping them to the subframes using rules (implicit or explicit) that reduce cross correlation and interference across users or UEs 12. The apparatus is in the form of UE 12 that is capable of using sidelink or D2D communications with other UEs 12.

According to another aspect, there is provided a method performed by first UE 12 operating in a wireless system 10 employing sidelink or D2D communications, the wireless system 10 comprising at least second UE 12 capable in performing sidelink or D2D communications. The method comprising: generating at least one reference sequence of at least one reference signal; mapping the at least one reference sequence of the at least one reference signal to at least one subframe for sidelink or D2D communication, wherein the mapping is specific to first UE 12; and transmitting the mapped reference sequence of the at least one reference signal to second UE 12 in order to reduce correlation, and thus reduce interference between reference signal Resource Elements (REs) belonging to first UE 12 respectively second UE 12.

According to another aspect, there is provided first UE 12 operating in a wireless system employing sidelink or D2D communications, the wireless system comprising at least second UE 12 capable in performing sidelink or D2D communication. First UE 12 comprising a processor 26 or processing module 26 and memory 28 or memory module 28, memory 28 or memory module 28 contacting instructions executable by processor 26 or processor module 26 whereby first UE 12 is operative or configure to generate at least one reference sequence of at least one reference signal; map the at least one reference sequence of the at least one reference signal to at least one subframe for sidelink or D2D communication, wherein the mapping operation is specific to first UE 12; and to transmit the mapped reference sequence of the at least one reference signal to second UE 12 in order to reduce correlation, and thus reduce interference between reference signal Resource Elements (REs) belonging to first UE 12 respectively second UE 12.

An advantage with the proposed solution is to reduce cross correlation, and thus reduced interference between reference signals (e.g. DMRS signals) belonging to different UEs 12 by determining UE specific mapping(s) of reference signals that reduce the likelihood of reference signal-to-reference signal interference and hence enable adequate channel estimation quality in e.g. rapidly changing channel conditions.

According to one aspect of the disclosure, UE 12 for transmission of a demodulation reference signal, DMRS, for sidelink communications is provided. UE 12 includes processing circuit 26 configured to: determine at least one transmission parameter associated with at least one of data transmission and control information transmission, and generate a DMRS using the determined at least one transmission parameter. UE 12 includes transmitter circuit 22 configured to transmit the DMRS.

According to one embodiment of this aspect, processing circuit 26 is further configured to determine a base sequence based on the at least one transmission parameter. The DMRS is generated based on the base sequence. According to one embodiment of this aspect, the base sequence is generated for each Orthogonal Frequency Division Multiplexing, OFDM, symbol that carries the DMRS. The base sequence is based on the at least one transmission parameter. According to one embodiment of this aspect, processing circuit 26 is further configured to determine a cyclic shift, CS, based on the at least one transmission parameter, the CS being applied to each base sequence.

According to one embodiment of this aspect, processing circuit 26 is further configured to determine a cyclic shift, CS, based on the at least one transmission parameter, the DMRS being generated based on the CS. According to one embodiment of this aspect, processing circuit 26 is further configured to determine an orthogonal cover code, OCC, based on the at least one transmission parameter. The DMRS is generated based on the OCC. According to one embodiment of this aspect, the OCC is applied in a time domain to symbols of the DMRS.

According to one embodiment of this aspect, the at least one transmission parameter includes at least one of: a frequency position of resources associated with at least one of data transmission and control information transmission, a priority of content included in a Physical Sidelink Control Channel, PSCCH, and a number of transmissions of a transmission block. According to one embodiment of this aspect, the at least one transmission parameter includes at least one parameter of one of a Physical Sidelink Control Channel, PSCCH, and a Physical Sidelink Shared Channel, PSSCH. According to one embodiment of this aspect, the at least one transmission parameter includes at least one parameter of a scheduling assignment associated with at least one of the data transmission and the control information transmission. According to one embodiment of this aspect, processing circuit 26 is further configured to map the DMRS to a plurality of resources elements of a plurality of subcarriers. The plurality of subcarriers has subcarrier indices of $\{k, n+k, 2n+k, 3n+k, \ldots\}$, where k is greater than 0, and n is greater than k.

According to another aspect of the disclosure, a method for UE 12 for transmission of demodulation reference signal, DMRS, for sidelink communications is provided. At least one transmission parameter associated with at least one of data transmission and control information transmission is determined. A DMRS is generated using the determined at least one transmission parameter. The DMRS is transmitted.

According to one embodiment of this aspect, a base sequence is determined based on the at least one transmission parameter, the DMRS being generated based on the base sequence. According to one embodiment of this aspect, the base sequence is generated for each Orthogonal Frequency Division Multiplexing, OFDM, symbol that carries the DMRS. The base sequence is based on the at least on transmission parameter. According to one embodiment of this aspect, the processing circuit is further configured to determine a cyclic shift, CS, based on the at least one transmission parameter, the CS being applied to each base sequence.

According to one embodiment of this aspect, a cyclic shift, CS, is determined based on the at least one transmission parameter. The DMRS is generated based on the CS. According to one embodiment of this aspect, an orthogonal cover code, OCC, is determined based on the at least one transmission parameter. The DMRS is generated based on the OCC. According to one embodiment of this aspect, the OCC is applied in a time domain to symbols of the DMRS.

According to one embodiment of this aspect, the at least one transmission parameter includes at one of: a frequency position of resources associated with at least one of data transmission and control information transmission, a priority of content included in a Physical Sidelink Control Channel, PSCCH, and a number of transmissions of a transmission block. According to one embodiment of this aspect, the at least one transmission parameter includes at least one parameter of one of a Physical Sidelink Control Channel, PSCCH, and a Physical Sidelink Shared Channel, PSSCH.

According to one embodiment of this aspect, the at least one transmission parameter includes at least one parameter of a scheduling assignment associated with at least one of the data transmission and the control information transmission. According to one embodiment of this aspect, the DMRS is mapped to a plurality of resources elements of a plurality of subcarriers. The plurality of subcarriers has subcarrier indices of $\{k, n+k, 2n+k, 3n+k, \ldots\}$, where k is greater than 0, and n is greater than k.

According to another aspect of the disclosure, UE 12 for transmission of demodulation reference signal, DMRS, for sidelink communications is provided. UE 12 includes processing module 26 configured to: determine at least one transmission parameter associated with at least one of data transmission and control information transmission, and generate a DMRS using the determined at least one transmission parameter. UE 12 includes transmitter module 22 configured to transmit the DMRS.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A user equipment for transmission of a demodulation reference signal, DMRS, for sidelink communications, the user equipment comprising:
a processing circuit configured to:
determine at least one transmission parameter associated with at least one of data transmission and control information transmission, the at least one transmission parameter includes at least one of:
at least one of a time position and frequency position of resources associated with a physical channel; and
scheduled bandwidth for the physical channel; and
generate a DMRS using the determined at least one transmission parameter; and
a transmitter circuit configured to transmit the DMRS.

2. The user equipment of claim 1, wherein the processing circuit is further configured to:
determine a base sequence based on the at least one transmission parameter, the DMRS being generated based on the base sequence.

3. The user equipment of claim 2, wherein the base sequence is generated for each Orthogonal Frequency Division Multiplexing, OFDM, symbol that carries the DMRS, the base sequence being based on the at least one transmission parameter.

4. The user equipment of claim 2, wherein the processing circuit is further configured to:
determine a cyclic shift, CS, based on the at least one transmission parameter, the CS being applied to each base sequence.

5. The user equipment of claim 1, wherein the processing circuit is further configured to:
determine a cyclic shift, CS, based on the at least one transmission parameter, the DMRS being generated based on the CS.

6. The user equipment of claim 1, wherein the processing circuit is further configured to:

determine an orthogonal cover code, OCC, based on the at least one transmission parameter, the DMRS being generated based on the OCC.

7. The user equipment of claim 6, wherein the OCC is applied in a time domain to symbols of the DMRS.

8. The user equipment of claim 1, wherein the at least one of the time position and frequency position of resources associated with the physical channel includes a frequency position of resources associated with at least one of data transmission and control information transmission; and the at least one transmission parameter includes at least one of:
 a priority of content included in a Physical Sidelink Control Channel, PSCCH; and
 a number of transmissions of a transmission block.

9. The user equipment of claim 1, wherein the physical channel is one of a Physical Sidelink Control Channel, PSCCH, and a Physical Sidelink Shared Channel, PSSCH.

10. The user equipment of claim 1, wherein the at least one of the time position and frequency position of resources associated with a physical channel is at least one parameter of a scheduling assignment associated with at least one of the data transmission and the control information transmission.

11. The user equipment of claim 1, wherein the processing circuit is further configured to:
 map the DMRS to a plurality of resources elements of a plurality of subcarriers; and
 the plurality of subcarriers having subcarrier indices of $\{k, n+k, 2n+k, 3n+k, \ldots\}$, where k is greater than 0, and n is greater than k.

12. A method for a user equipment for transmission of demodulation reference signal, DMRS, for sidelink communications, the method comprising:
 determining at least one transmission parameter associated with at least one of data transmission and control information transmission, the at least one transmission parameter includes at least one of:
  at least one of a time position and frequency position of resources associated with a physical channel; and
  scheduled bandwidth for the physical channel; and
 generating a DMRS using the determined at least one transmission parameter; and
 transmitting the DMRS.

13. The method of claim 12, further comprising:
 determining a base sequence based on the at least one transmission parameter, the DMRS being generated based on the base sequence.

14. The method of claim 13, wherein the base sequence is generated for each Orthogonal Frequency Division Multiplexing, OFDM, symbol that carries the DMRS, the base sequence being based on the at least on transmission parameter.

15. The method of claim 13, wherein the processing circuit is further configured to:

determine a cyclic shift, CS, based on the at least one transmission parameter, the CS being applied to each base sequence.

16. The method of claim 12, further comprising:
 determining a cyclic shift, CS, based on the at least one transmission parameter, the DMRS being generated based on the CS.

17. The method of claim 12, further comprising:
 determining an orthogonal cover code, OCC, based on the at least one transmission parameter, the DMRS being generated based on the OCC.

18. The method of claim 17, wherein the OCC is applied in a time domain to symbols of the DMRS.

19. The method of claim 12, wherein the at least one of the time position and frequency position of resources associated with the physical channel includes a frequency position of resources associated with at least one of data transmission and control information transmission; and the at least one transmission parameter includes at least one of:
 a priority of content included in a Physical Sidelink Control Channel, PSCCH; and
 a number of transmissions of a transmission block.

20. The method of claim 12, wherein the physical channel is one of a Physical Sidelink Control Channel, PSCCH, and a Physical Sidelink Shared Channel, PSSCH.

21. The method of claim 12, wherein the at least one of the time position and frequency position of resources associated with a physical channel is at least one parameter of a scheduling assignment associated with at least one of the data transmission and the control information transmission.

22. The method of claim 12, further comprising:
 mapping the DMRS to a plurality of resources elements of a plurality of subcarriers; and
 the plurality of subcarriers having subcarrier indices of $\{k, n+k, 2n+k, 3n+k, \ldots\}$, where k is greater than 0, and n is greater than k.

23. A user equipment for transmission of demodulation reference signal, DMRS, for sidelink communications, the user equipment comprising:
 a processing module configured to:
  determine at least one transmission parameter associated with at least one of data transmission and control information transmission, the at least one transmission parameter includes at least one of:
   at least one of a time position and frequency position of resources associated with a physical channel; and
   scheduled bandwidth for the physical channel; and
  generate a DMRS using the determined at least one transmission parameter; and
 transmitter module configured to transmit the DMRS.

* * * * *